Figure 1:
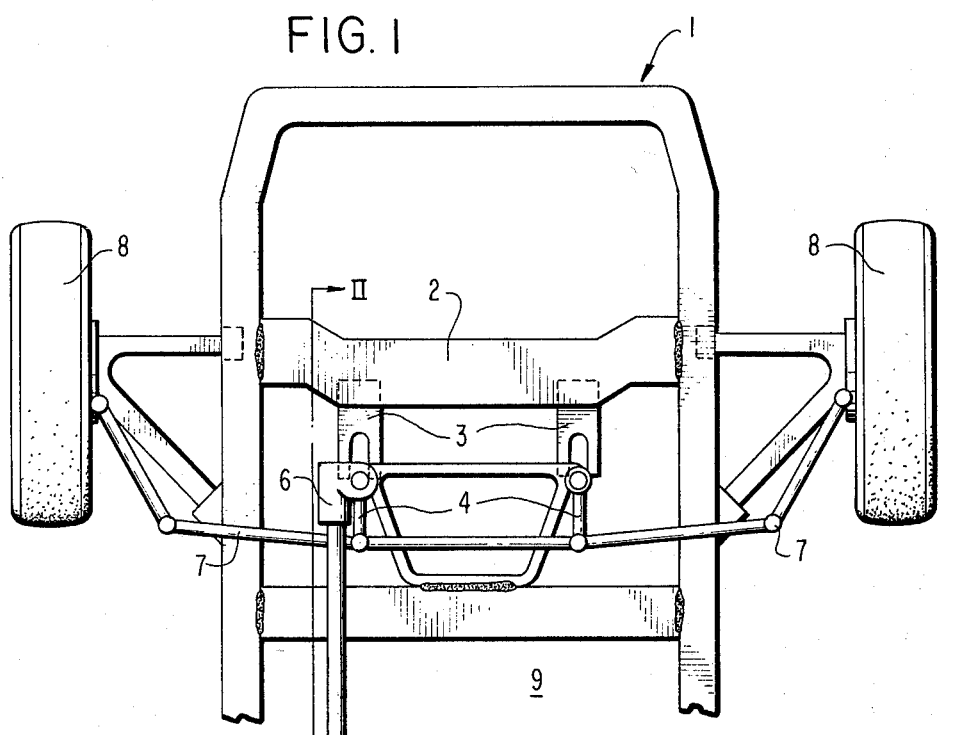

United States Patent [19]

Stegmaier

[11] 3,998,468
[45] Dec. 21, 1976

[54] COLLISION RESPONSIVE STEERING BLOCKING SYSTEM

[75] Inventor: Wilhelm Stegmaier, Stuttgart, Germany

[73] Assignee: Daimler-Benz Aktiengesellschaft, Germany

[22] Filed: Nov. 29, 1974

[21] Appl. No.: 528,495

[30] Foreign Application Priority Data

Dec. 1, 1973   Germany .................. 2359943

[52] U.S. Cl. .............................. 280/87 C; 180/97; 293/2; 280/748
[51] Int. Cl.$^2$ ........................................ B60R 21/10
[58] Field of Search ............ 280/87 R, 87 C, 95 R, 280/748; 180/97, 91, 92, 94, 82 R, 103 A, 103 R; 293/2; 296/35 B

[56] References Cited
UNITED STATES PATENTS

| | | | |
|---|---|---|---|
| 1,123,538 | 1/1915 | Imamura | 293/2 |
| 1,251,639 | 1/1918 | Chadwick | 180/97 |
| 1,936,054 | 11/1933 | Harzbecker | 180/97 |
| 2,737,255 | 3/1956 | Senkewich | 180/97 |
| 2,751,995 | 6/1956 | Kastory | 180/97 |
| 3,424,263 | 1/1969 | Black | 280/87 R X |
| 3,596,730 | 8/1971 | Cecce | 280/95 R X |
| 3,672,697 | 6/1972 | Knowles | 180/82 R X |
| 3,734,228 | 5/1973 | Rivolier | 180/82 R |

Primary Examiner—M. H. Wood, Jr.
Assistant Examiner—John P. Silverstrim
Attorney, Agent, or Firm—Craig & Antonelli

[57] ABSTRACT

A steering system for motor vehicles, especially for passenger motor vehicles in which parts of the front section are so constructed that they act on parts of the steering linkage in the sense of blocking the steering in case of a displacement of these parts of the front section in the direction toward the passenger space which displacement is caused by a front-end impact or front-end collision.

17 Claims, 2 Drawing Figures

COLLISION RESPONSIVE STEERING BLOCKING SYSTEM

The present invention relates to a steering system for motor vehicles, especially for passenger motor vehicles.

It frequently happens during accidents that drivers of motor vehicles whose safety belts are not fastened impinge with the upper body against the steering wheel and thereby deform the rim thereof especially in its lower area whereby, as viewed from an overall point of view, a larger impact surface is created. In order to facilitate the creation of such a larger impact surface which is more favorable in its position and at the same time to absorb at least a part of the energy of the impinging body, it is also known to provide adjoining the steering wheel a deformation member frequently designated as impact pot which enables an adaption of the position of the steering wheel to an impinging body.

Most recent investigations and tests of front-end impact-accidents of passenger motor vehicles, however, have called attention to an appearance dangerous for the driver which can be described by the term "tumbling movement of the steering wheel." Such a tumbling movement occurs when the already deformed steering wheel or when the steering wheel changed in its inclination by deformation of the impact pot is suddenly set into rotation by shocks acting on the front wheels in the further course of accident or by structural parts acting on the parts of the steering linkage as a result of the deformation of the front part or front section of the vehicle. As a result thereof, in lieu of the desired, approximately vertical position of the steering wheel rim, a nearly horizontal position thereof may suddenly follow therefrom whereby an extremely unfavorable impact situation with high surface pressure results at the steering wheel rim for the upper body of the driver.

The present invention is therefore concerned with the task to provide a steering system for motor vehicles in which in case of front-end impact-accidents such a tumbling movement of the steering wheel dangerous for the driver is avoided with certainty.

This is achieved according to the present invention in that parts of the motor vehicle front section are so constructed that they act on parts of the steering linkage in the sense of blocking the steering during a displacement caused by a front-end impact in the direction toward the vehicle passenger space.

According to a preferred embodiment of the present invention, the steering gear arm is blocked during a deformation of the vehicle front section.

According to a particularly advantageous construction of the present invention, at least one guide member which during the deformation of the front section surrounds a steering gear arm or an extension secured thereat, is provided at parts of the vehicle front section, for example, at a cross bearer.

Accordingly, it is an object of the present invention to provide a steering system for vehicles, especially passenger motor vehicles, which avoids by simple means the aforementioned shortcomings and drawbacks encountered in the prior art.

Another object of the present invention resides in a steering system for motor vehicles, especially for passenger motor vehicles, which greatly reduces the danger of serious injury for the driver when impinging against an improperly positioned steering wheel rim.

A still further object of the present invention resides in a steering system for passenger motor vehicles which prevents a so-called tumbling movement of the steering wheel after the occurrence of a front-end impact.

Another object of the present invention resides in a steering system for motor vehicles, especially passenger motor vehicles, in which the steering system is blocked when a front-end impact occurs.

Still a further object of the present invention resides in a steering system for passenger motor vehicles which is simple in construction, yet effectively prevents improper movements of the steering wheel after the occurrence of a front-end impact, particularly after the deformation of the front section of the vehicle.

Figure 2:
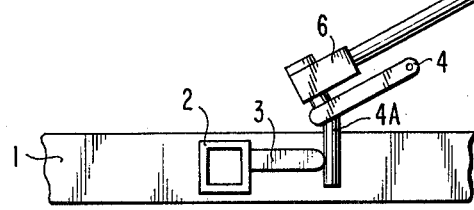

These and other objects, features and advantages of the present invention will become more apparent from the following description when taken in connection with the accompanying drawing which shows, for purposes of illustration only, multiple embodiments in accordance with the present invention, and wherein:

FIG. 1 is a schematic top plan view of one embodiment of a steering system for a passenger motor vehicle equipped with a blocking means in accordance with the present invention; and FIG. 2 is a schematic partial view, taken along line II—II of FIG. 1 and showing a modified arrangement of the present invention. Referring now to the FIG. 1 of the drawing, the schematically illustrated front section or front part generally designated by reference numeral 1, for example, of a passenger motor vehicle, includes a cross bearer 2 on which are fixedly arranged guide member 3 which—as viewed from the side—are disposed at the same height as the steering gear arms 4, by means of which the steering movement is transmitted from the steering wheel 5A and spindle 5 and the steering gear 6 to the wheels 8 by way of track-rods or tie-rods 7. If the front section 1 of the vehicle is now being compressed during an accident and is displaced in the direction toward the passenger cell 9, then the guide members 3 which point rearwardly and extend in the straight drive position of the steering system in the direction of the center longitudinal axis of the vehicle, slide over the steering gear levers and practically surround the same so that the steering is moved to the straight drive position and is blocked.

This blocking of the steering system is without any practical significance for the operation of the vehicle damaged in the course of the accident since no steering movements can be carried out any longer anyhow with a vehicle whose front section is far-reachingly deformed.

In case that it is difficult, for example, for space reasons to accommodate guide members and steering gear levers or arms in the same horizontal plane, it is also contemplated to provide extensions 4A (FIG. 2) projecting upwardly or downwardly from the steering gear arm depending on the installation possibility, which in case of a collision are then seized or gripped by the guide members 3 and thus similarly prevent a transmission of a rotary movement to the steering wheel 5A.

While I have shown and described only multiple embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A steering system for motor vehicles of the type having an end section, a driver accommodating space, a steering wheel disposed in said driver accommodating space, and steering linkage means supported at said end section and connected to said steering wheel for transmitting turning movements to wheels of the vehicle, wherein said end section includes means engageable with said steering linkage means in response to a predetermined displacement of said end section toward the driver accommodating space caused by an impact against said end section, said engageable means forcing said steering linkage means to a predetermined position and blocking further rotation of said steering linkage means as said end section experiences further collision forces.

2. A steering system according to claim 1, wherein said end section is a front section of said vehicle.

3. A steering system according to claim 2, in which the steering linkage means includes a steering gear arm, characterized in that movement of the steering gear arm is substantially blocked during the deformation of the vehicle front section.

4. A steering system according to claim 2, characterized in that said engageable means includes at least one guide means substantially surrounding a part of the steering linkage means during deformation of the front section.

5. A steering system according to claim 3, characterized in that said part comprises said steering gear arm of the steering linkage means.

6. A steering system according to claim 3, characterized in that said part is an extension secured at said steering gear arm of the steering gear linkage means.

7. A steering system according to claim 3, wherein said steering linkage means includes tie rods, characterized in that in the center position of the steering means corresponding to a straight drive, the end of the steering gear arm operatively connected with the tie rods points rearwardly.

8. A steering system according to claim 7, characterized in that the guide means is provided at a cross bearer of the vehicle front section.

9. A steering system according to claim 8, characterized in that said part comprises said steering gear arm.

10. A steering system according to claim 8, characterized in that said part comprises an extension secured at the steering gear arm.

11. A steering system according to claim 4, characterized in that the guide means is provided at a cross bearer of the vehicle front section.

12. A steering system according to claim 3, wherein said steering linkage means includes tie rods, characterized in that in the center position of the steering means corresponding to a straight drive, the end of the steering gear arm operatively connected with the tie rods points rewardly.

13. A steering system according to claim 2, wherein said predetermined position comprises a position corresponding to a straight—ahead drive of the vehicle.

14. A steering system according to claim 1, characterized in that said engageable means includes at least one guide means substantially surrounding a part of the steering linkage means during deformation of the end section.

15. A steering system according to claim 11, characterized in that the guide means is provided at a cross bearer of the vehicle front section.

16. A steering system according to claim 14, characterized in that said part comprises a steering gear arm of the steering linkage means.

17. A steering system according to claim 14, characterized in that said part includes an extension secured at a steering gear arm of the steering gear linkage means.

* * * * *